United States Patent
Wortmann et al.

(10) Patent No.: US 10,358,250 B2
(45) Date of Patent: Jul. 23, 2019

(54) PLASTICS MATERIAL CONTAINER

(71) Applicant: KRONES AG, Neutraubling (DE)

(72) Inventors: Joerg Wortmann, Birkenau (DE);
Gerald Huettner, Vilseck (DE);
Bastian Tißmer, Regensburg (DE)

(73) Assignee: KRONES AG (DE)

( * ) Notice: Subject to any disclaimer, the term of this patent is extended or adjusted under 35 U.S.C. 154(b) by 31 days.

(21) Appl. No.: 14/172,653

(22) Filed: Feb. 4, 2014

(65) Prior Publication Data

US 2014/0227399 A1 Aug. 14, 2014

(30) Foreign Application Priority Data

Feb. 11, 2013 (DE) .................. 10 2013 101 332

(51) Int. Cl.
*B65D 1/02* (2006.01)
*B29C 49/18* (2006.01)
*B29C 49/48* (2006.01)

(52) U.S. Cl.
CPC ............ *B65D 1/0261* (2013.01); *B29C 49/18* (2013.01); *B29C 49/4802* (2013.01); *B65D 1/0284* (2013.01)

(58) Field of Classification Search
CPC .......................... B65D 1/0261; B65D 1/0284
See application file for complete search history.

(56) References Cited

U.S. PATENT DOCUMENTS

| | | | |
|---|---|---|---|
| 3,395,955 A | 8/1968 | Mansell et al. | 215/1 C |
| 4,294,366 A | 10/1981 | Chang | 215/1 C |
| 4,785,949 A | 11/1988 | Krishnakumar et al. | 215/1 C |
| 4,867,323 A | 9/1989 | Powers | 215/1 C |
| 5,024,339 A | 6/1991 | Reimer | 215/1 C |
| 5,024,340 A | 6/1991 | Alberghini et al. | 215/1 C |
| 5,072,841 A | 12/1991 | Okhai | 215/1 C |

(Continued)

FOREIGN PATENT DOCUMENTS

| | | | | |
|---|---|---|---|---|
| DE | 696 00 693 | 5/1999 | ............ | B29C 49/08 |
| DE | 10 2010 064 125 | 6/2012 | ............ | B29C 49/48 |

(Continued)

OTHER PUBLICATIONS

Extended European Search Report (no translation) issued in related application No. 14154709.1, dated Jul. 7, 2014 (10 pgs).

(Continued)

*Primary Examiner* — Stephen J Castellano
(74) *Attorney, Agent, or Firm* — Hayes Soloway P.C.

(57) ABSTRACT

A one piece plastics material container has mouth, a wall portion adjoining the mouth in a longitudinal direction (L) and a base portion in the form of a standing face. The base portion has an injection point—situated on the inside in a radial direction (R) with respect to the longitudinal direction (L)—on the outer wall of the plastics material container, a central area which surrounds the injection point, and a transition portion which extends from the central area to the wall portion. The transition portion has in at least one radial direction (R) and preferably in each radial direction (R) a curvature with a finite radius of curvature in at least one portion. The base portion has a plurality of reinforcement ribs which starting from the central area extend in the direction of the wall portion.

23 Claims, 9 Drawing Sheets

(56) References Cited

U.S. PATENT DOCUMENTS

| | | | |
|---|---|---|---|
| 5,133,468 A | 7/1992 | Brunson et al. | 215/1 C |
| 5,353,954 A | 10/1994 | Steward et al. | 220/608 |
| 5,427,258 A | 6/1995 | Krishnakumar et al. | 215/400 |
| 5,507,402 A | 4/1996 | Clark | 215/375 |
| 5,529,196 A | 6/1996 | Lane | 215/375 |
| 5,713,480 A * | 2/1998 | Petre | B65D 1/0284 |
| | | | 215/373 |
| 5,785,197 A | 7/1998 | Slat | 215/375 |
| 6,153,145 A | 11/2000 | Desoutter et al. | 264/521 |
| 6,276,546 B1 | 8/2001 | Davis et al. | 215/375 |
| 6,612,451 B2 * | 9/2003 | Tobias | B65D 1/0284 |
| | | | 206/501 |
| 7,416,089 B2 * | 8/2008 | Kraft | B65D 1/0276 |
| | | | 215/373 |
| 8,469,214 B2 | 6/2013 | Boukobza | 215/375 |
| 8,485,375 B2 * | 7/2013 | Colloud | B65D 1/02 |
| | | | 215/375 |
| 2003/0196926 A1 | 10/2003 | Tobias | B65D 1/0284 |
| | | | 206/509 |
| 2005/0127024 A1 * | 6/2005 | Darr | B29C 49/0073 |
| | | | 215/382 |
| 2008/0223816 A1 * | 9/2008 | Darr | B65D 1/0223 |
| | | | 215/382 |
| 2010/0032404 A1 * | 2/2010 | Colloud | B65D 1/0284 |
| | | | 215/371 |
| 2010/0119643 A1 * | 5/2010 | Boukobza | B29C 49/48 |
| | | | 425/522 |
| 2011/0049083 A1 | 3/2011 | Scott et al. | 215/371 |
| 2012/0168401 A1 | 7/2012 | Tissmer et al. | 215/372 |
| 2013/0087568 A1 | 4/2013 | Hermel et al. | 220/600 |

FOREIGN PATENT DOCUMENTS

| | | | |
|---|---|---|---|
| EP | 2 133 277 | 12/2009 | B65D 1/02 |
| WO | WO 98/28193 | 7/1998 | B65D 1/42 |
| WO | WO2011157952 | 12/2011 | B65D 1/02 |

OTHER PUBLICATIONS

International Search Report issued in corresponding PCT Appln. Serial No. PCT/US97/23442 dated Apr. 27, 1998 (3 pgs).

* cited by examiner

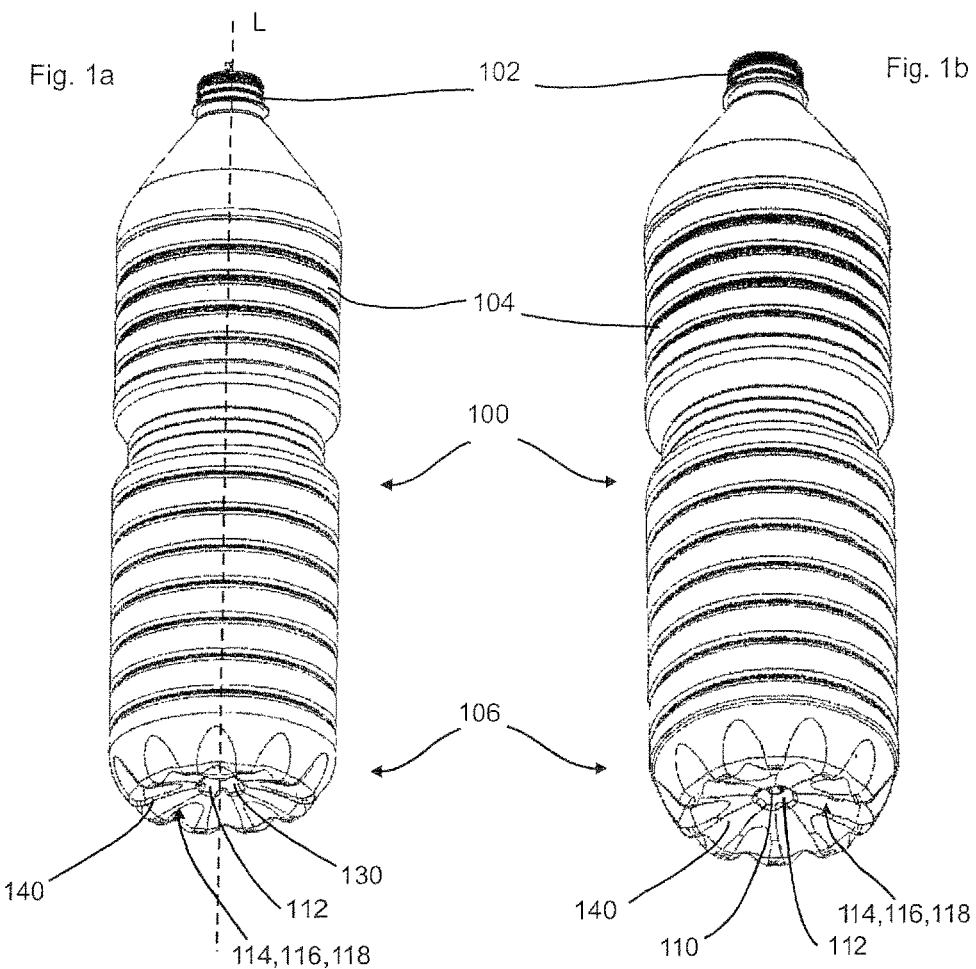
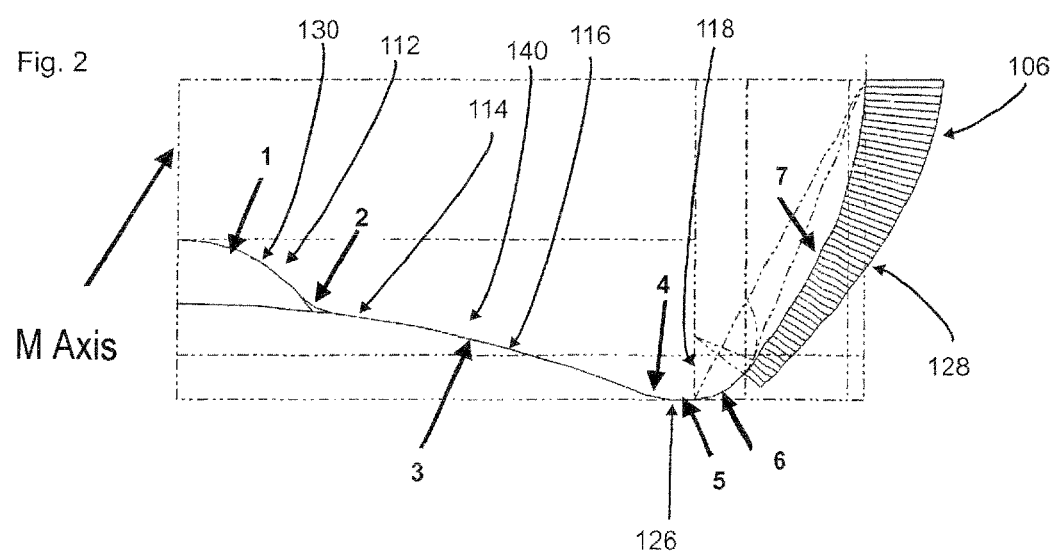

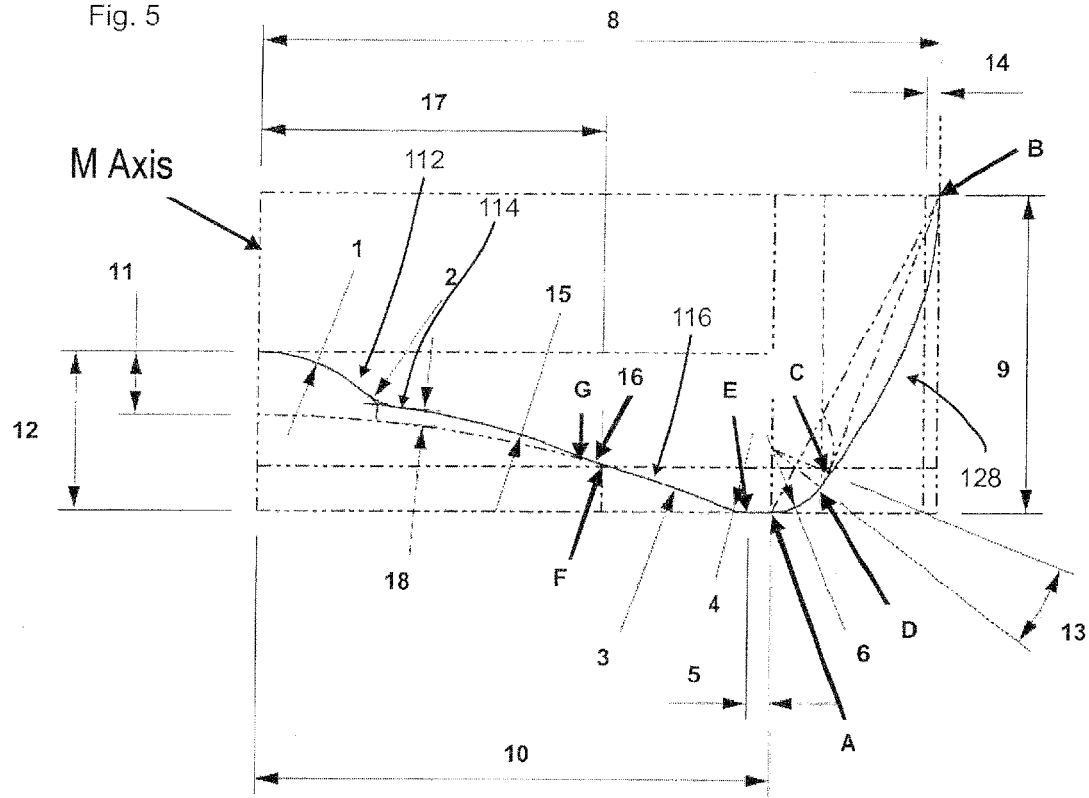

110

M Axis

M Axis

Fig. 16
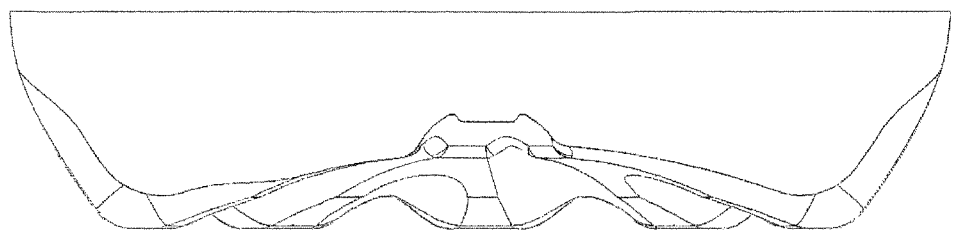
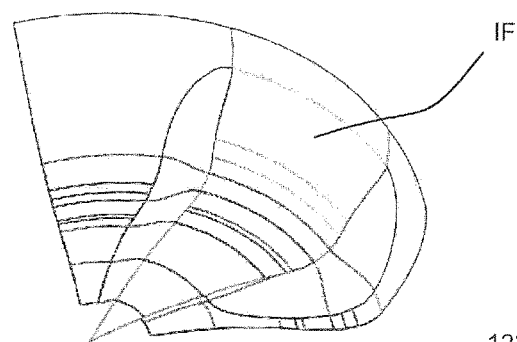
Fig. 17a
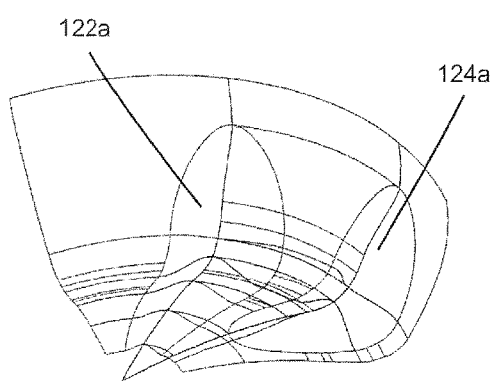
Fig. 17b
Fig. 17c
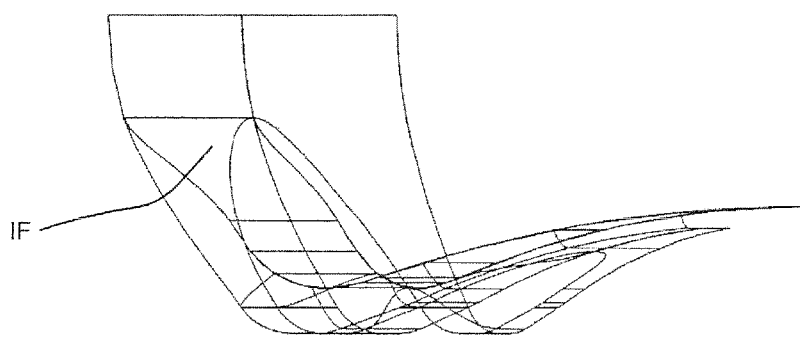

PLASTICS MATERIAL CONTAINER

BACKGROUND OF THE INVENTION

The present invention relates to a plastics material container, in particular for the reception of beverages. Containers of this type have been known from the prior art for a relatively long time and are replacing glass bottles as beverage containers to an increasing degree. The advantage of these plastics material containers lies, in particular, in the lower weight, in the optimum ease of handling with respect to design and, in part, in their wide versatility. Various bottles of widely differing sizes are known from the prior art both for small filling quantities in the range of 200 ml up to large filling quantities of 5 l. These containers have widely differing shapes in this case. Within the scope of production methods, preforms are blown out or expanded respectively, for example by means of air pressure, to form the plastics material containers. For this purpose, preforms are usually introduced into a mould and are expanded with respect to this mould.

In order to save costs, attempts are made to produce the plastics material containers with an increasingly lower expenditure of material. This means on the other hand, however, that increasingly higher demands have to be made upon the stability of the bottles in relation to the quantity of material used.

In particular, the bases of these plastics material containers are particularly critical. These bases must also act as standing faces for the containers on the one hand and they must also withstand higher internal pressures in part on the other hand. At the same time the bases should also be produced with an increasingly lower expenditure of material.

The present invention relates, in particular, to containers for so-called still water and products lightly acted upon with pressure. In these products the character, in particular the root radii of the bottle bases on the flutings of the base are possible only with a high manufacturing blow moulding pressure of over 30 bar. This means, however, an increased energy expenditure in the production of containers of this type. In addition, such a high manufacturing blow moulding pressure of over 30 bar for shaping the root radii of the flutings of a base design also has no certainty of stability under pressure without an assessment of the bottle in the filled state.

The object of the invention is therefore to provide an inexpensive production of the plastics material container, which nevertheless will also withstand specific internal pressures. In particular, a plastics material container should be made available in this case which can also be produced with lower manufacturing blow moulding pressures. Even in the case of the filling of still beverages, in particular without aeration, the plastics material container has to withstand light internal pressures which can be caused for example by increased external temperatures in the environment of the plastics material container.

SUMMARY OF THE INVENTION

A plastics material container according to the invention for the reception of beverages has an mouth, a wall portion adjoining this mouth in a longitudinal direction of the plastics material container and a base portion which is designed in the form of a standing face (and which adjoins the wall portion). In this case the plastics material container is formed in one piece and the base portion has an injection point—situated on the inside in a radial direction with respect to the longitudinal direction—on the outer wall of the plastics material container. In addition, the plastics material container has a central area, which surrounds this injection point, as well as a transition portion which extends from this central area to the wall portion, this transition portion having in at least one radial direction and preferably in each radial direction of the plastics material container a curvature with a finite radius of curvature in at least one portion, and the base portion having provided in it a plurality of reinforcement ribs which starting from the central area extend in the direction of the wall portion.

According to the invention the central area has a first dome-like structure, in such a way that the injection point projects in the direction of the aperture of the plastics material container in the longitudinal direction of the plastics material container, this first dome-like structure of the central area being adjoined in the central direction on the outside by a second dome-like structure, this second dome-like structure being arched in the direction of the aperture of the plastics material container, a radius of curvature of the first dome-like structure being smaller at least locally than a radius of curvature of the second dome-like structure.

On account of this design of the container it is possible for the manufacturing blow moulding pressure for the containers to be reduced to less than 20 bar. With this manufacturing blow moulding pressure the geometry of the base described here can be shaped out very well. In addition, the design of the base described here is characterized by a degree of certainty for the pressure stability in the filled state and is stable under pressure in a filled state even according to thermostability tests of more than 38° over 24 hours. In this case this container can withstand pressures in the range of at least 0.5 bar. In preferred embodiments described in greater detail below, it is even possible to withstand pressures in the range of at least 0.8 bar.

It is advantageous for the aforesaid central area to have a circular cross-section and, as mentioned above, to be made dome-like or cupola-like. In this way, the injection point of the container itself extends in the direction of the internal volume, and this has the result that even under pressure stressing the injection point does not project downwards in the longitudinal direction of the container or obstruct the stability thereof.

The second dome-like structure is also used, in particular, for absorbing pressures or for counteracting them respectively. It is preferable for the central area to have a smaller radius of curvature in its complete area than the second dome-like structure. In this case it is possible for these radii of curvature to be continuous, but it would also be possible for the radii of curvature to change in a radial course of the wall.

It is advantageous for a radius of curvature in the first dome-like structure of the central area to be in a range of between 5.00 mm and 20.0 mm, in particular between 8.0 mm and 15.0 mm. The radius of curvature in the second dome-like area or the second dome-like structure respectively is in a range of between 40.0 mm and 120 mm, in particular between 50.0 mm and 90.0 mm. It is preferable for a ratio between the radius of curvature in the first dome-like structure and the radius of curvature in the second dome-like structure to be between 0.02 and 0.5. It is preferable for a radius of curvature in the respective areas to be substantially continuous in each case. "Substantially continuous" is to be understood in this case as being that the radius of curvature changes by not more than 10°, preferably by not more than 5°, and in a particularly preferred manner by not more than 3°, with respect to an average value.

In this case the aforesaid courses or the radii of curvature thereof are in a direction at a right angle to the longitudinal direction of the plastics material container as viewed in a projection in each case. In addition, the second dome-like structure is thus arched in the direction of the internal volume of the container.

It is advantageous for at least one portion of the base portion to merge in a tangentially continuous manner into a further portion of the base portion. In this way, it may be possible for example for a first portion with a first radius of curvature to merge in a tangentially continuous manner into a second portion with a second radius of curvature which differs therefrom.

The tangential constancy refers in this case, as mentioned above, to a transition of a first portion or a first radius of curvature respectively or a spline into an adjacent curve, which can likewise be a straight line, a spline or a curved portion. In this case an angle of 180° should be achieved in the transition. For this purpose, in the case of a spline of the first order for example, this spline is rotated over its first support polynomial in such a way that a run-in of 180° is achieved.

It is preferable for at least two portions of the base portion to merge into a further portion of the base portion in each case in a tangentially continuous manner.

In this way, it is possible for example for the radius of the central area to merge in a tangentially continuous manner into the first radius of the transition area adjoining on the outside. In addition, a first radius of the transition area can merge in a tangentially continuous manner into a further area of the transition area situated radially on the outside. Furthermore, a radius of the area of curvature can also merge into a radius of a base of the container in a tangentially continuous manner. In addition, it is also possible for a curved portion of a base area of the container to merge into a portion of the wall of the container in a tangentially continuous manner.

In the case of a further advantageous embodiment a standing face of the plastics material container is made annular at least locally, this standing face having a pre-set standing circle diameter. A locally annular course is to be understood as meaning that both a continuous annular course may be involved, but preferably this annular course is interrupted at least once and preferably a multiplicity of times in particular by the reinforcement ribs mentioned above.

In the case of a further advantageous embodiment a ratio between the standing circle diameter and an external diameter of the plastics material container is between 0.5 and 0.95, preferably between 0.6 and 0.95, in a particularly preferred manner between 0.615 and 0.935, preferably between 0.65 and 0.9, and in a particularly preferred manner between 0.65 and 0.85.

In the case of a further advantageous embodiment the base portion in the region of a standing face of the base portion has a portion with a substantially straight course. In particular, a region inside the standing face is made substantially straight. In this case it is advantageous for this straight portion to adjoin the second dome-like body or the second dome-like structure respectively at least indirectly in the radial direction of the container.

In addition, a so-called spline of the base area, i.e. a course which is formed by a polynomial of the nth order, can adjoin this straight course.

A substantially straight course is to be understood that a radius of curvature in this region is at least twice as great as the radii of curvature of the other regions, preferably at least three times as great, preferably at least five times as great, and preferably at least ten times as great. An infinite radius of curvature, i.e. an exactly straight course, however, is also possible.

It is preferable for this course extending substantially in a straight line to have a length which is between 0.01 mm and 2 mm.

In the case of a further advantageous embodiment the plastics material container has a plurality of similar first reinforcement ribs as well as a plurality of second, preferably similar, reinforcement ribs, the first reinforcement ribs and the second reinforcement ribs being geometrically different from one another. In this way, it is preferable for at least three first reinforcement ribs to be provided, preferably at least four first reinforcement ribs, preferably at least five first reinforcement ribs and in a particularly preferred manner five first reinforcement ribs. In addition, at least three second reinforcement ribs are preferable, in a particularly preferred manner at least four second reinforcement ribs, and in a particularly preferred manner at least five second reinforcement ribs and in a particularly preferred manner exactly five second reinforcement ribs. In this case the first and the second reinforcement ribs are preferably arranged alternating with one another in the peripheral direction of the base portion.

In the case of a further advantageous embodiment a standing face of the plastics material container is interrupted at least by the first reinforcement ribs. It is preferable for the standing face also to be interrupted by the second reinforcement ribs.

In the case of a further advantageous embodiment the reinforcement ribs, also referred to below as flutings, have different lengths in a radial direction. In this case it is preferable for the longer flutings, i.e. the first reinforcement ribs, to extend to the central area mentioned above and preferably to intersect the latter at least locally. The second reinforcement ribs preferably do not extend to the central area. It is advantageous for the first and the second reinforcement ribs to extend equally far towards the outside in the radial direction and preferably to have a substantially uniform profile in this region.

The present invention further relates to a method of producing a plastics material container of the type described above. In this case plastics material preforms are first made available. In addition, these plastics material preforms are heated and finally the plastics material preforms are expanded inside a blow mould, in which case a base part of this blow mould is designed in such a way that it produces a base portion of a plastics material container according to at least one of the preceding claims.

According to the invention the plastics material preforms are acted upon with a gaseous medium with at least two different pressure stages for their expansion, one of these pressure stages being a finishing blow moulding pressure and this finishing blow moulding pressure being below 30 bar, preferably below 25 bar and in a particularly preferred manner below 20 bar. On account of these selected pressure stages it is possible, as mentioned above, for a considerable saving in energy to be achieved in the shaping. On the other hand, however, these pressure stages are sufficient to produce the appropriate base portion. It is preferable for a duration of the stressing with the finishing blow moulding pressure to be between 0.9 seconds and 2.2 seconds.

The present invention further relates to the use of a plastics material container of the type described above for filling with a still beverage, for example a still water. Beverages of this type preferably produce an internal pressure of less than 1.5 bar, in particular of less than 1.0 bar, inside the container in a closed state thereof.

The invention further relates to a blow mould for producing a plastics material container of the type described above. In this case this blow mould has a base part which is suitable for producing a base portion for the plastics material container of the type described above. It is advantageous for the blow mould also to have two side parts which are used for producing a peripheral wall of the plastics material container.

BRIEF DESCRIPTION OF THE DRAWINGS

Further advantages and embodiments are evident from the accompanying drawings. In the drawings FIGS. 1a, 1b are two illustrations of containers according to the invention;

FIG. 2 is an illustration of an external contour of a container according to the invention in a first embodiment;

FIG. 5 is a further illustration of an external contour of a container according to the invention in a second embodiment;

FIG. 6 is an illustration of an internal contour of a container according to the invention;

FIG. 16 is a sectional illustration of a base portion, and

FIGS. 17a-c are three partial perspective illustrations of a base portion.

DETAILED DESCRIPTION OF THE INVENTION

Figure 3:
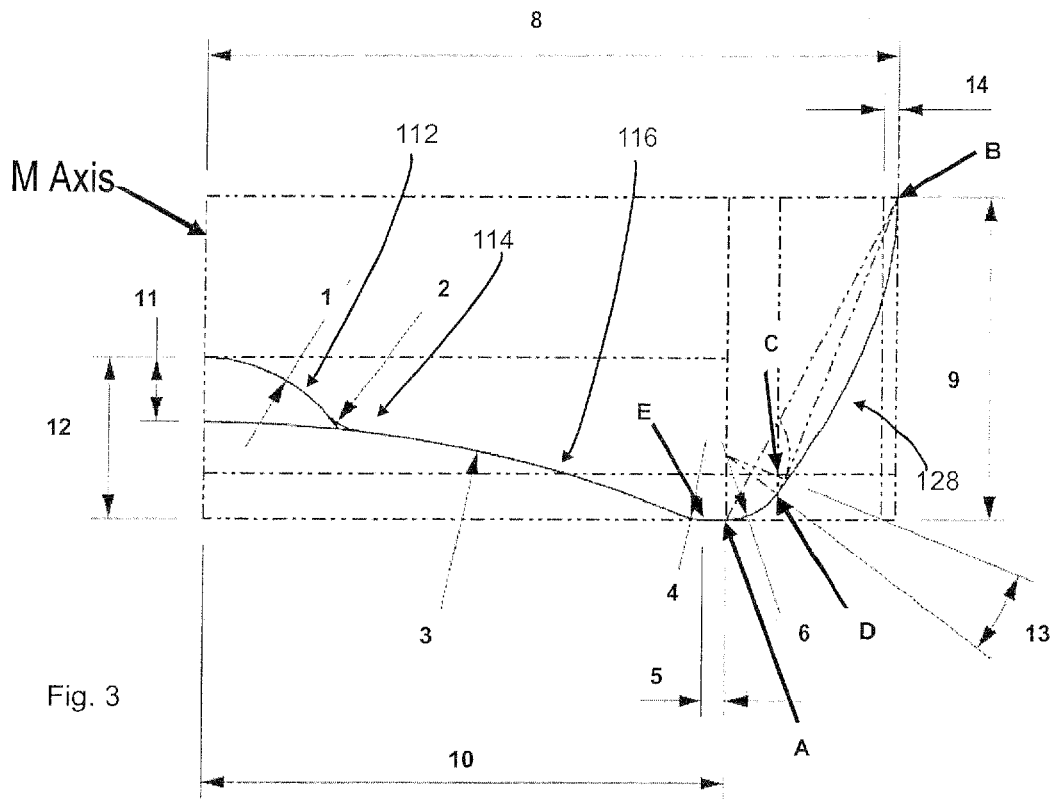
FIG. 3 is a further illustration of an external contour of a container according to the invention in a first embodiment.

The following figures describe a base design, in particular for still products lightly acted upon with pressure up to 2.0 bar internal pressure. Typical filling quantities of containers of this type are between 200 ml and 5.0 l, in which case a low finishing blow moulding pressure is used and an improved moulding-out capacity of the base geometry is ensured.

FIGS. 1a and 1b are illustrations of a container 100 according to the invention in two possible embodiments. In this case the container 100 has in each case an aperture area 102 which has a reduced diameter as compared with a diameter of the container 100. This aperture area 102 is adjoined by a continuous wall portion 104 which surrounds the volume of liquid present in the container. The reference letter L designates the longitudinal direction of the plastics material container. The wall portion 104 is adjoined by a base portion 106 of the container, which base portion 106 will be considered in greater detail below.

This base portion 106 has in this case the injection point 110 which is typical in the case of plastics material containers of this type and which is situated in a central area 112. This central area 112 has in this case, as may be seen from the figures, a dome-like structure which extends into the interior of the container 100. This central area 112 is adjoined by a transition area which also extends in the direction of the wall portion 104 in a radial direction of the container at a right angle to the longitudinal direction L. This transition portion in turn has a plurality of subsidiary portions 114, 116, 118 which jointly form this transition portion. In this case, however, these subsidiary portions can be designed so as to merge into one another. It will be noted that this transition portion too has a dome-like structure which extends inwards in the direction of the central area, i.e. towards the internal volume of the container. Nevertheless, it will be noted that the central area is significantly more curved than the transition area.

FIGS. 2 and 3 describe an external base contour of a container according to the invention in a first embodiment. It is explicitly pointed out that the features of the designs now described in detail are capable of being used not only in a combination thereof but also individually. In this way for example, different courses of curvature of the different designs can also be combined with one another. The same also applies to the other dimensions described below.

A first variant of the external base contour is described by the small dome radius 1, the radius 2, the external dome radius 3, the internal root radius 4, the straight line 5, the root radius 6 and a spline 7. In particular, a standing face of the plastics material container is also defined in this case by the straight line 5. It will be noted that the radius 2 (and also the radius 6) is also opposed to the radii 1 and 3, i.e. the curvature is reversed in this area with respect to the surroundings. In this way it is possible for the more pronounced curvature in the central area 112, formed by the small dome radius 1, to be able to merge into the less pronounced curvature in the first subsidiary portion 114 of the transition portion.

It is preferable for the radii of curvature in the specified subsidiary portions of the base portion to be substantially continuous in each case.

In this way, a second dome-like structure 140 of the transition area is also present in this case in addition to the first dome-like structure 130 of the central area.

Figure 8:
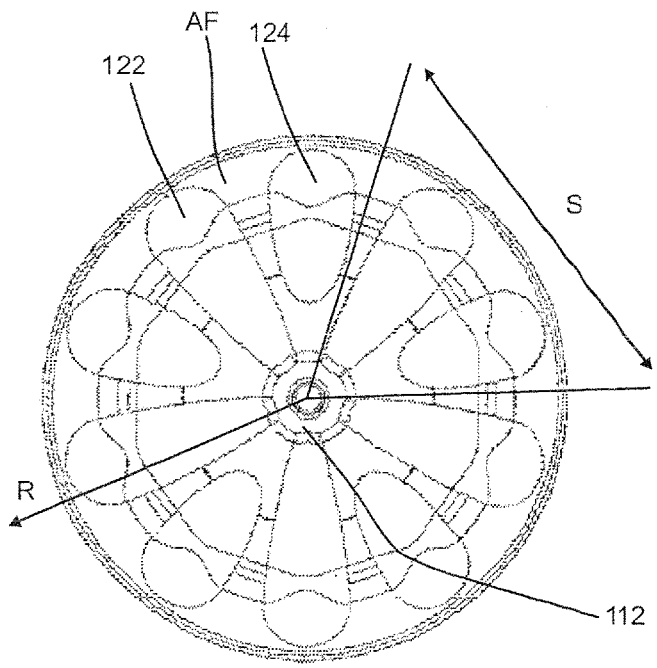
FIG. 8 is a plan view of a base portion of a container according to the invention.

The so-called outer face AF of the base geometry or the base portion 106 respectively, as shown in FIG. 8, is formed from this contour by a rotation about the axis of rotation M.

The transitions of the aforesaid radii (which are, in particular, radii of curvature), i.e. the small dome radius 1, the radius 2, the external dome radius 3, the internal root radius 4 and the root radius 6, are at least in part and preferably all tangentially continuous. The transition from the root radius 6 to the spline 7 can be curvature-continuous, but at least tangentially continuous. The spline 7 merges preferably in a curvature-continuous manner and in a particularly preferred manner at least in a tangentially continuous manner, into the external diameter 128 (cf. FIG. 3). The course of the curvature of the spline 7 can be described by a polynomial of the nth degree, n preferably being equal to or greater than 2 and smaller than 7.

The external dimensions of the base are set by the external diameter 8 and the base height 9. The dimension of the standing circle diameter 10 is preferably set by a ratio with respect to the external diameter 8. This ratio can range for example between 0.615 and 0.935, in particular between 0.65 and 0.85.

The straight line or stretch AE (cf. FIG. 3) can have a length of between 0.01 mm and 2.0 mm or is preferably indicated by a ratio with respect to the external diameter 8. The internal root radius 4 can be equally large as, larger than or smaller than the root radius 6. The root radius can also be defined by way of a ratio with respect to the external diameter 8.

The height 12 of the small dome radius 1 and the height 11 of the external dome radius 3 are preferably both described by different ratios with respect to the external diameter 8.

The starting point D of the spline 7 (viewed starting from the geometrical centre of the base portion) is formed in this case by a straight line between B and C. The straight line BC is tangential to the root radius in this case. The starting point D of the spline 7 can be determined with the aid of an angle 13 on the root radius 6 between the points A and C. The distance dimension 14 is used to define the distances of the geometries of the fluting cut-outs.

In this way, in the design of the base portion shown in FIGS. 2 and 3, the latter is formed from at least two regions of different curvature and a portion extending in a straight line and a spline adjoining them. The base portion is, as mentioned above, made circular as a whole.

Figure 7:
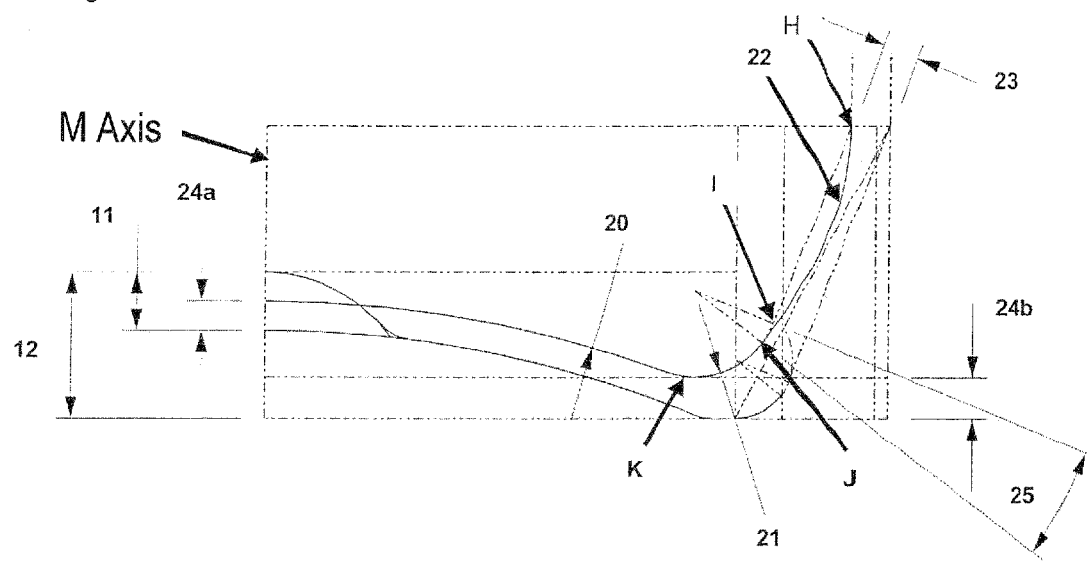
FIG. 7 is a further illustration of an internal contour of a container according to the invention.

The external base contour described here, also referred to as "a base contour on the outside", refers to the outer skin of the base and is illustrated in FIG. 7 for example by the contour between the reference number 11 and as far as the reference number 23. In particular, the regions or portions respectively outside the ribs or flutings respectively are involved in this case.

Figure 4:
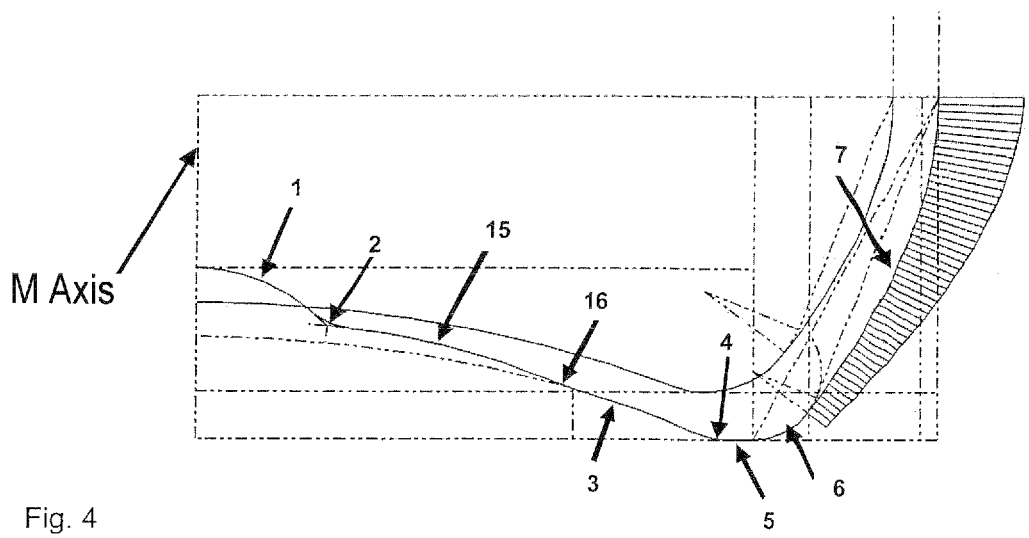
FIG. 4 is an illustration of an external contour of a container according to the invention in a second embodiment.

FIGS. 4 and 5 show an external base contour for a further advantageous design of a container according to the invention. It is pointed out that the features shown in the FIGS. 2 and 3 and the features shown in the FIGS. 4 and 5 can also be joined to and/or combined with one another in order to arrive at further possible designs lying within the scope of the present invention.

FIGS. 4 and 5 describe, in particular, a design using a double dome (expressed more precisely, a structure with two dome-like substructures whilst disregarding the dome-like structure of the central area).

This variant of the base contour towards the outside is described by the small dome radius 1, the radius 2, the internal dome radius 15, the connecting radius 16, the external dome radius 3, the internal root radius 4, the straight line 5, the root radius 6 and a spline 7. The so-called outer face AF (cf. FIG. 8) of the base geometry is formed from this contour by a rotation about the axis of rotation M.

In this way, in addition to the first dome-like structure 130 of the central area, a second dome-like structure 140 (formed by the internal dome radius 15) and a third dome-like structure (formed by the external dome radius 3 of the transition area) are present in this case, this third dome-like structure 150 adjoining the second dome-like structure on the outside in the radial direction R. The second dome-like structure and the third dome-like structure form a double dome in this way.

The radii of curvature of these two dome-like structures, however, differ only slightly from each other in this case and the ratio thereof is in a range of between 0.2 and 0.9, in particular between 0.3 and 0.85.

The transitions of the radii, the small dome radius 1, the radius 2, the internal dome radius 15, the connecting radius 16, the external dome radius 3, the internal root radius 4 and the root radius 6 are at least in part and preferably all tangentially continuous. The transition from the root radius 6 to the spline 7 can be curvature-continuous, but at least tangentially continuous. The spline 7 merges in a curvature-continuous manner, and at least in a tangentially continuous manner, into the external diameter 8 or 128 respectively. The course of the curvature of the spline 7 can be described by a polynomial of the nth degree, n preferably being greater or equal to 2 and smaller than 7. The external dimensions of the base are set by the external diameter 8 and the base height 9. The dimension of the standing circle diameter 10 is set by a ratio with respect to the external diameter 8. This ratio can range between 0.615 and 0.935, in particular between 0.65 and 0.85.

The height of the internal dome radius 15 to the external dome radius 3 is defined by way of the distance dimension 18 which, in particular, is between 0.4 mm and 3.0 mm. The connecting radius 16 can have a value of between 1.0 mm and 15 mm, in particular between 3.0 mm and 10.0 mm. The connecting radius 16 adjoins the internal dome radius 15 at the point G and merges into the external dome radius 3 at the point F.

The dimension 17 of the internal dome diameter at the point F is set by a ratio with respect to the external diameter 8. This ratio can range between 0.3 and 0.6.

The straight line AE can have a length of between 0.01 mm and 2.00 mm, in particular between 0.5 mm and 1.5 mm, or is indicated by a ratio with respect to the external diameter. The internal radius 4 can be as equally large as, larger or smaller than the root radius 6. The root radius can also be defined by way of a ratio with respect to the external diameter 8.

The height 12 of the small dome radius and the height 11 of the external dome radius are both described by different ratios with respect to the external diameter 8. The starting point D of the spline 7 is formed by a straight line between B and C. The straight line BC is tangential to the root radius. The starting point D of the spline 7 can be determined with the aid of an angle 13 on the root radius 6 between the points A and C. The distance dimension 14 is used to define the distances of the geometries of the fluting cut-outs.

FIGS. 6 and 7 describe an internal base contour or a "base contour on the inside" respectively. This is the contour of the base in which the flutings or reinforcements respectively shown more precisely below are arranged, as may be seen for example between the references 24a and H in FIG. 7.

The internal base contour or the base contour on the inside respectively is described by an internal contour dome radius 20, the internal contour root radius 21 and a spline 22. The so-called inner face IF (cf. FIG. 17a) of the base geometry is formed from this contour by a rotation about the axis of rotation M.

The transitions of the radii, the internal contour dome radius 20, and the internal contour root radius 21 are at least in part and preferably all tangentially continuous with respect to one another. The transition from the internal contour root radius to the spline 22 can preferably be curvature-continuous, but at least tangentially continuous. The spline 22 merges preferably in a curvature-continuous manner, but at least in a tangentially continuous manner, into a straight line—which is preferably parallel to the external diameter 8—at the point H. The straight line HI (FIG. 7) is preferably parallel to the straight line BC shown in FIG. 3 and the distance between the two straight lines can be defined by way of the dimension or the distance 23 respectively. The course of the curvature of the spline 22 for the internal contour can be described by a polynomial of the nth degree, n preferably being greater than or equal to 2 and smaller than 7.

The distance between the base contour on the inside and the base contour on the outside is defined by way of the dimension 24a from the internal contour dome radius as far as the external contour dome radius. The distance between the base contour on the inside (point K) and the base contour on the outside (point A in FIG. 3) is defined by way of the dimension 24b at the level of the standing circle diameter. The distances between the base contour on the inside and the base contour on the outside are preferably variable in the centre and at the level of the standing circle diameter.

The following 3 variants are capable of being set in this case:

In the case of the first variant these dimensions 24a and 24b are equal, in the case of the second variant the dimension 24a is smaller than the dimension 24b and in the case of the third variant the dimension 24a is greater than the dimension 24b.

The distance between the base contour on the inside and the base contour on the outside can be defined between the standing circle diameter 10 and the external diameter 8 by way of the distance dimension 23 between the points H and B (FIG. 3). It is possible for the distances 24b and 23 between the base contour on the inside and the base contour on the outside to be varied, in particular in combination with the variants of the distances 24a and 24b.

In this case the dimension or the distance 24b respectively can be equal, larger or smaller with respect to the distance dimension 23.

The starting point J of the spline is preferably formed by a straight line between the points H and I. The straight line HI is tangential to the internal contour root radius 21. The starting point J of the spline can be determined with the aid of an angle 25 on the internal contour root radius 21 between the points I and K. The dimension of the internal contour root radius 21 can be indicated in a ratio with respect to the root radius of the external contour 6 (cf. FIGS. 2 and 3).

FIG. 8 is a plan view of a base portion of the container. It will be noted that in this case 5 first reinforcement ribs 122 or flutings respectively and 5 second reinforcement ribs 124 or flutings respectively are provided which are arranged alternating with one another in a peripheral direction of the base portion. In this case the first reinforcement ribs extend into the central area 112, but the second ribs 124 which are shorter in the radial direction R, on the other hand, do not. As shown in FIG. 8, fluting segments S can be formed or defined respectively:

A fluting segment comprises a long (122) and a short (124) fluting. The base can contain a number of a minimum of 3 fluting segments to a maximum of 8 fluting segments on the periphery. The size of the opening angle of a fluting segment results from the number of long flutings 122 used (360°/number).

Figure 9:
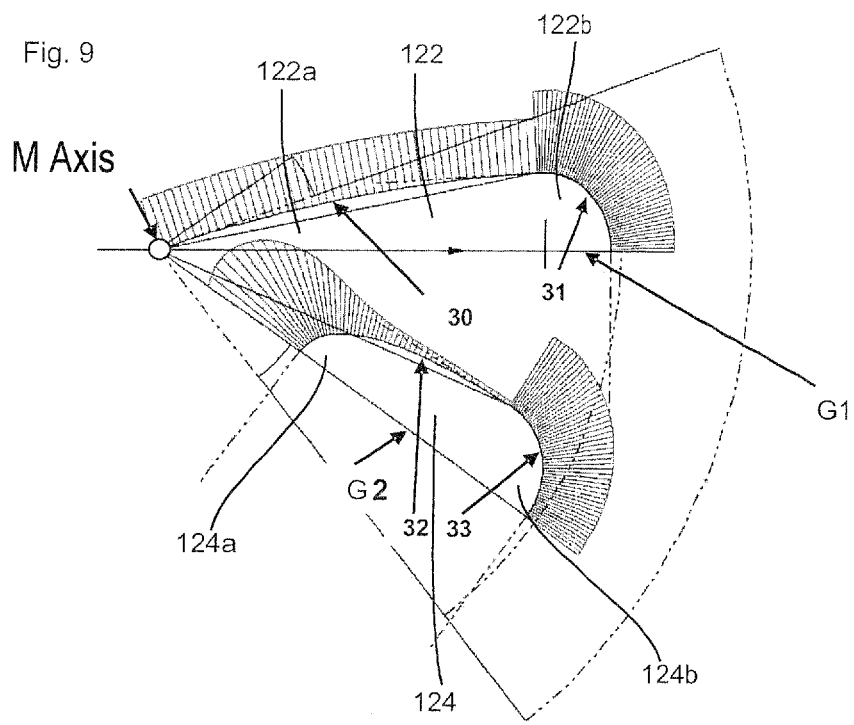
FIG. 9 is an illustration to explain the fluting segments.
Figure 10:
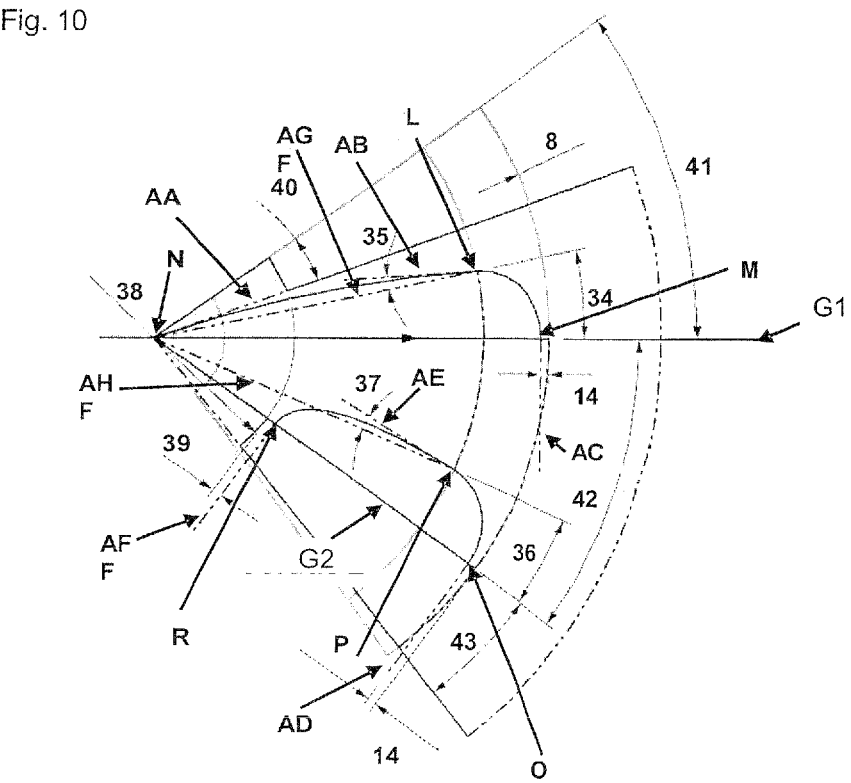
FIG. 10 is a further illustration to explain the fluting segments.

FIGS. 9 and 10 illustrate the geometry of the reinforcement ribs, in particular of the longer reinforcement ribs or flutings 122 respectively. It is pointed out in this case that in the context of the present application the two terms "flutings" and "ribs" are used synonymously.

The geometry of the cut-outs for the long fluting 122 is described by the spline 30 and the spline 31. In this case the respective radii of curvature are also indicated here by the vertical lines projecting vertically from the lines in each case. The longer these lines are, the smaller the respective radius of curvature. In addition, the lines illustrated in this figure again result from a projection in a radial direction at a right angle to the longitudinal direction of the container. It will be noted that the first reinforcement rib is formed by a first area 122a formed with a pre-set larger radius of curvature and a second area 122b adjoining the first area and with a second radius of curvature. In this case the second radius of curvature is smaller than the first radius of curvature.

It is preferable for the first radius of curvature in the area 122a and, in a particularly preferred manner, also the second radius of curvature in the area 122b to be substantially constant.

In the case of the second reinforcement rib 124 a high radius of curvature, which decreases radially towards the outside (area 124a), is first present as viewed from the inside towards the outside. In the adjoining area 124b the radius of curvature is equal to or substantially equal to the radius of curvature in the area 122b. The geometrical structure of the two areas 122b and 124b is similar and is preferably substantially identical.

The spline 30 is tangentially continuous with respect to the auxiliary straight line AA at the point N and tangentially continuous with respect to the auxiliary straight line AB at the point L. These two auxiliary straight lines form an angle with each other which is less than 20°, preferably less than 10°. The spline 31 is tangentially continuous with respect to the auxiliary straight line AB at the point L and tangentially continuous with respect to the auxiliary straight line AC at the point M.

The radii of curvature of the splines 30 and 31 can be described by a polynomial of the nth degree, n being equal or greater than 2 and preferably smaller than 7. The cut-out geometry for the long fluting 122 is preferably mirror-symmetrical to the straight line G1. The character of the spline 30 is preferably produced by way of a tapered profile control with a pre-set p value. This value can range between 0.01 and 0.99, in particular between 0.2 and 0.8.

The character of the spline 31 is produced by way of a tapered profile control with a ρ value. This value can range between 0.01 and 0.99, in particular between 0.2 and 0.6.

The auxiliary straight line AC is at a right angle to the straight line G1 at the point M. The point M can range between the dimension of the standing circle diameter 10 (FIG. 3) and the dimension of the external circle diameter 8 (FIG. 3) as viewed from the axis of rotation M and is defined by way of the dimension 14 (FIG. 2 and FIG. 10).

The point L ranges on the auxiliary straight line AG with the opening angle 34 on the radius path of the point D (FIG. 3 and FIG. 5) of the base contour on the outside. This opening angle is between 5° and 40°, preferably between 10° and 20°.

The width of the long fluting is defined by way of the angle 34. The auxiliary straight line AB starts at the point L and is controlled with the angle 35. The auxiliary straight line AA starts at the point N and is controlled with the angle 40. The profile of the spline 30 is controlled by way of the angles 35, 40 and the associated ρ value. The profile of the spline 31 is controlled by way of the angles 34, 35 and the associated ρ value, the angle 35 being between 1° and 30°, preferably between 3° and 15°, and the angle 40 being between 5° and 40°, preferably between 10° and 20°.

The cut-out geometry for the short fluting 124 is described by the spline 32 and the spline 33. The spline 32 is preferably tangentially continuous with respect to the auxiliary straight line AF at the point R and tangentially continuous with respect to the auxiliary straight line AE at the point P. The spline 33 is tangentially continuous with respect to the auxiliary straight line AE at the point P and tangentially continuous with respect to the auxiliary straight line AD at the point O.

The courses of the curvature of the splines 32 and 33 can be described by a polynomial of the nth degree, n being greater than or equal to 2 and preferably smaller than 7. The cut-out geometry for the short fluting is mirror-symmetrical to the straight line 2. The character of the spline 32 is produced by way of a tapered profile control with a ρ value. This value can range between 0.01 and 0.99, in particular between 0.1 and 0.7. The character of the spline 33 is produced by way of a tapered profile control with a ρ value. This value can range between 0.01 and 0.99, in particular between 0.2 and 0.6.

The straight line G2 is controlled by way of the angle 42, the latter being defined with half the opening angle of a fluting segment. The auxiliary straight line AD is preferably substantially at a right angle, and in a particularly preferred manner at a right angle, to the straight line G2 at the point O. The point O can range between the dimension of the standing circle diameter 10 (FIG. 3) and the dimension of the external circle diameter 8 (FIG. 3) as viewed from the axis of rotation (axis M) and is defined by way of the dimension 14 (FIG. 3 and FIG. 10).

The point P ranges on the auxiliary straight line AH with the opening angle 36 on the radius path of the point D (FIG. 3 and FIG. 5) of the base contour on the outside. The width of the short fluting is defined by way of the angle 36, the angle 36 preferably being between 5° and 40°, and in a particularly preferred manner between 10° and 20°. The auxiliary straight line AE starts at the point P and is controlled with the angle 37, the angle 37 preferably being between 1° and 30°, and in a particularly preferred manner between 3° and 15°. The auxiliary straight line AF starts at the point R and is at a right angle to the straight line 2. The profile of the spline 32 is controlled by way of the angles 37 and the associated ρ value. The profile of the spline 33 is controlled by way of the angles 37 and the associated ρ value.

The point R is defined by way of the distance 39 from the radius 38. The radius 38 is in a ratio with the smaller dome radius 1 (FIGS. 3 and 5). The angles 34 and 36 for controlling the width of the short and the long flutings can be equal or of different size.

The angles 35 and 37 for controlling the auxiliary straight lines AB and AE can be equal or of different size.

The ρ values of the splines 31 and 33 can be equal or of different size. The ρ values of the splines 30 and 32 can be equal or of different size.

FIGS. 11a to 11d describe a connection of the base contour on the outside, from one of the embodiments shown in the above FIGS. 2 to 5 with free formed surfaces for the long (122) and short (124) flutings.

The outer face AF is trimmed at the faces of the cut-out geometries of the flutings, which result from the splines 30, 31 (long fluting 122) and the splines 32, 33 (short fluting 124).

Intersection curves with the outer face AF (emphasized in black in FIG. 11b) are produced with the aid of auxiliary faces at structurally important points. The end points BA to BT of the intersection curves on the outer face of the base contours on the inside and on the outside are joined to splines 50 to 59. The points CA to CG of the intersection curves with the base contour on the inside are used as the support points of the splines 52 to 58, and the splines can be (preferably) curvature-continuous or tangentially continuous, but at least point-continuous, with the main intersection curves DA to DF of the points CA to CG.

The transition of the splines 50 to 59 in the end points BA to BT can be curvature-continuous, but at least tangentially continuous, with the outer face.

These splines 52 to 58 have a course of curvature which is described by a polynomial of the nth degree, n being equal to or greater than 2 and preferably smaller than 7.

The table below shows examples of the continuities:

| Variants | End points BA to BT | Support points CA to CG |
| --- | --- | --- |
| A | G1—tangential continuity | G0—point continuity |
| B | G1—tangential continuity | G1—tangential continuity |
| C | G1—tangential continuity | G2—curvature continuity |
| D | G2—curvature continuity | G0—point continuity |
| E | G2—curvature continuity | G1—tangential continuity |
| F | G2—curvature continuity | G2—curvature continuity |

Figure 12:
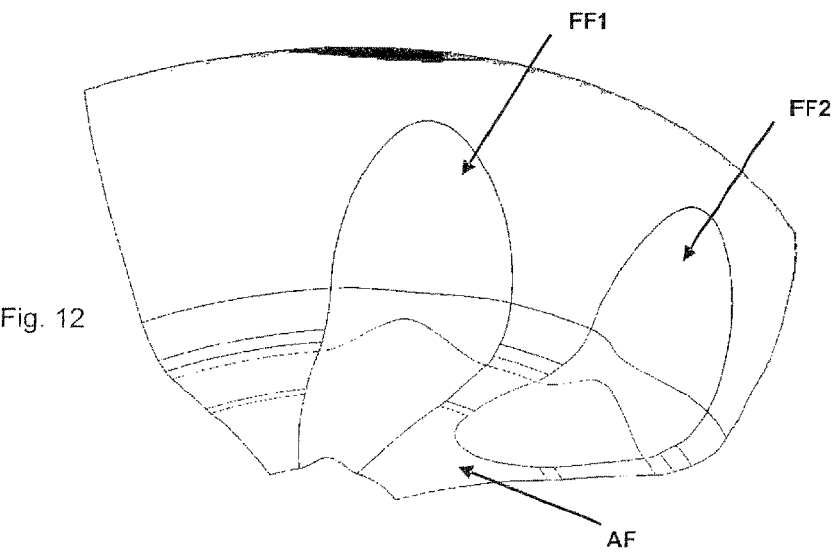
FIG. 12 is a further perspective illustration of a base portion.

FIG. 12 is a further perspective illustration of a base portion.

Figure 11A:
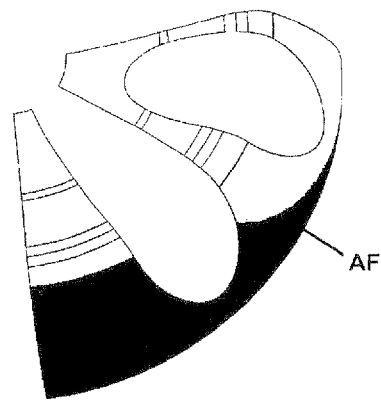
FIGS. 11a-11d are four perspective illustrations of a base portion.
Figure 11B:
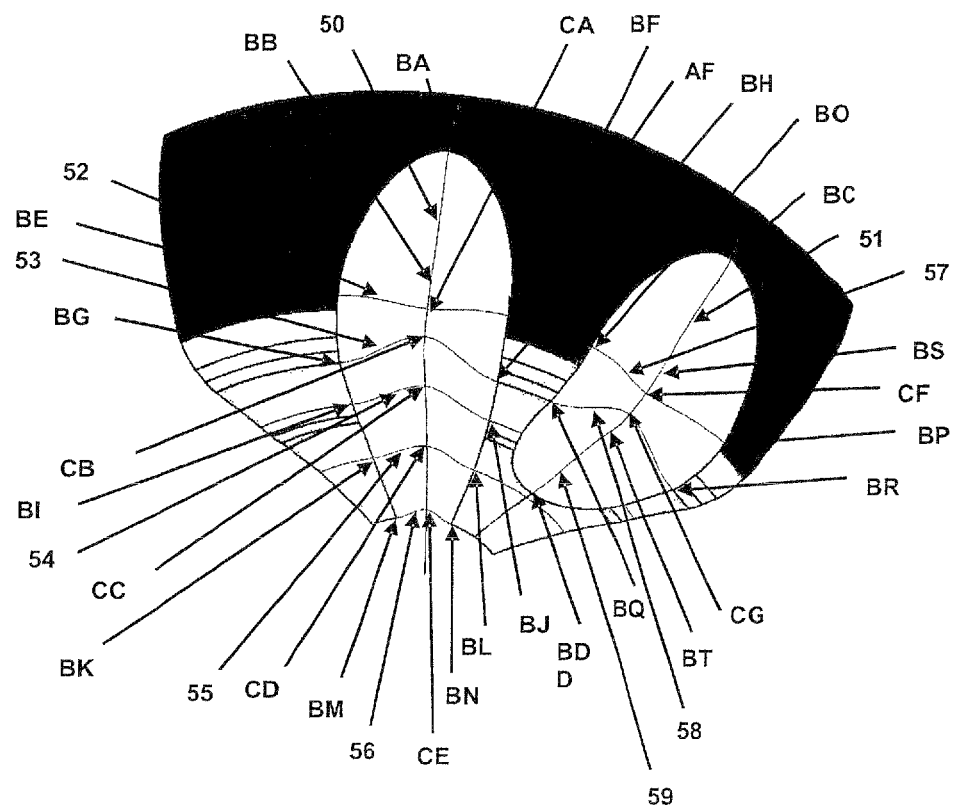
Figure 11C:
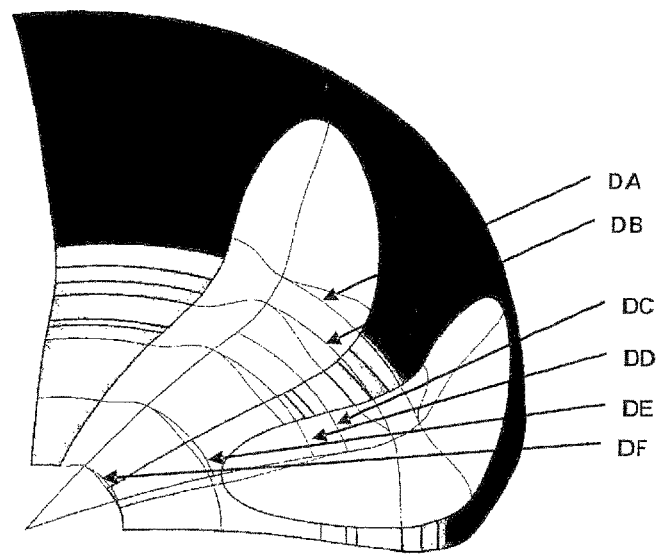
Figure 11D:
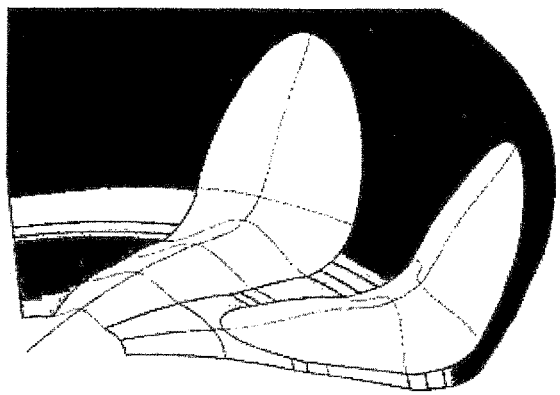

The free form surfaces FF1 and FF2 for the short and long flutings are formed at the edge of the outer face AF, the base contour on the inside and the splines 50 to 59 (FIG. 11b). These free form surfaces FF1 and FF2 can be curvature-continuous, but at least tangentially continuous, with the outer face AF.

It is therefore preferable for the base portion to be formed using free form surfaces.

The course of the curvature in the u and v directions of the free form surfaces FF1 and FF2 of the fluting segment can be described by polynomials of the nth degree, n being greater than or equal to 2 and preferably smaller than 7.

Figure 13:
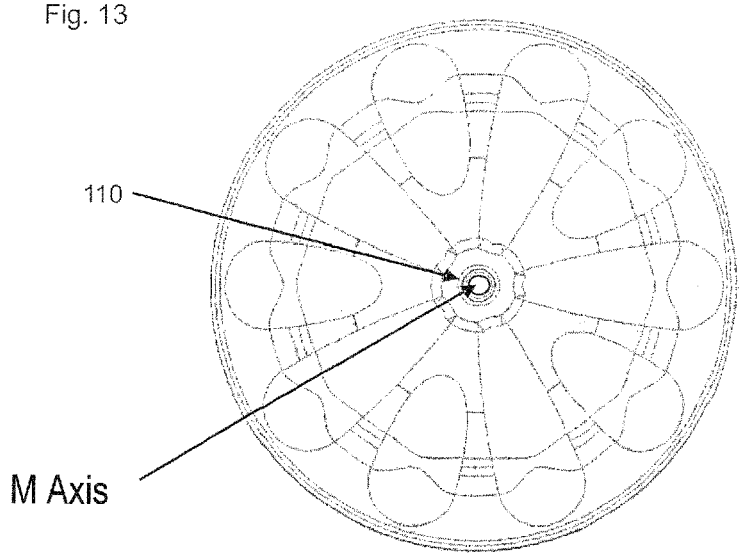
FIG. 13 is a further plan view of a base portion.
Figure 14:
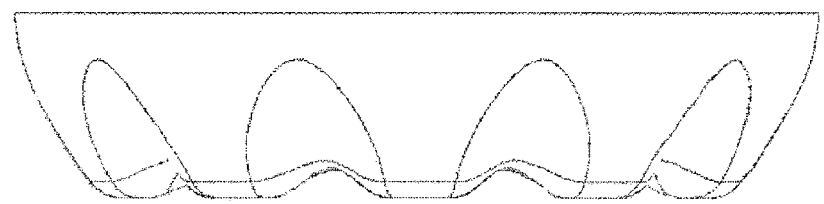
FIG. 14 is a side view of a base portion.

FIGS. 13 and 14 are two further illustrations of the base portion.

The fluting segment is multiplied by the number of long flutings, which has been previously defined, about the axis of rotation (axis M). An injection point 110 for centring the preform is added and the free form base for still products lightly acted upon with pressure up to 2.0 bar results in this way.

FIG. 13 is a view from below and FIG. 14 is a side view of a free form base for still products lightly acted upon with pressure up to 2.0 bar with 5 short and 5 long flutings.

Figure 15:
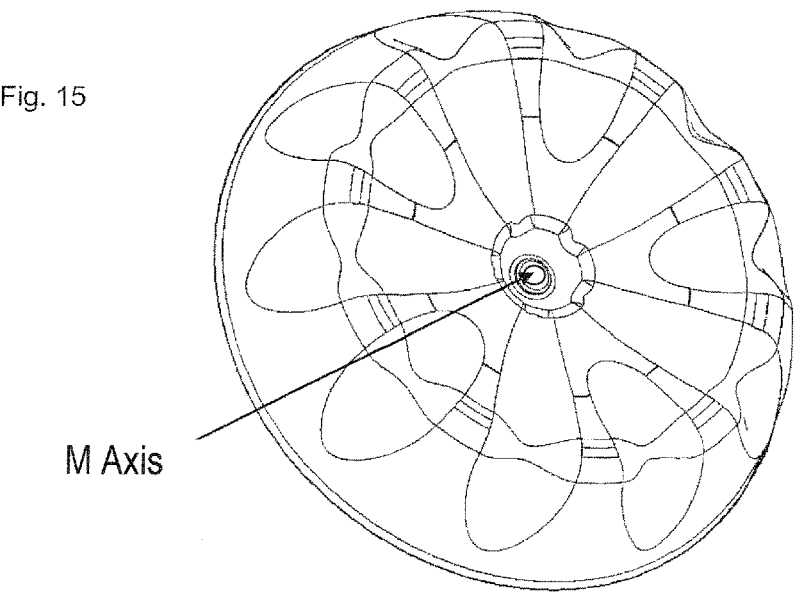
FIG. 15 is an oblique view of a base portion.

FIG. 15 is a rotated view from below and FIG. 16 is a section through a short and a long fluting of the free form base for still products lightly acted upon with pressure up to 2.0 bar with 5 loops.

FIGS. 17a to c are cut-away illustrations of the base portion. In this case the inner face IF is illustrated in turn on the one hand, but, in addition, however, it is also evident that the respective reinforcement ribs or flutings 122, 124 also extend into a region of the side wall (or a side region of the base portion respectively) of the plastics material container. In order words these reinforcement ribs are also visible in a view of the container in a radial direction of the container (in which direction the base itself is not visible from below). In addition, it is again evident that the reinforcement ribs are made geometrically equal in those portions which extend into the lateral region of the base portion.

The Applicant reserves the right to claim all the features disclosed in the application documents as being essential to the invention, insofar as they are novel either individually or in combination as compared with the prior art.

The invention claimed is:
1. A plastics material container for the reception of beverages, said container having a mouth, a wall portion adjoining the mouth in a longitudinal direction (L) of the plastics material container and a base portion designed in the form of a standing face, wherein the plastics material container is formed in one piece, and wherein the base portion has an injection point —situated on an inside in a radial direction (R) with respect to a longitudinal direction (L) —on an outer wall of the plastics material container, a central area which surrounds the injection point, as well as a transition portion which extends from the central area to the wall portion, wherein the transition portion has in at least one radial direction (R) a curvature with a finite radius of curvature in at least one portion, wherein the base portion includes a plurality of reinforcement ribs which starting from the central area extend in a direction of the wall portion, wherein the reinforcing ribs comprise free form surfaces having support splines, wherein the support splines are at least tangentially continuous with an outer face of the container and wherein substantially all points of the free form surface have a finite radius of curvature, wherein the central area has a first dome structure which is arched in a direction of the mouth of the plastics material container and from which the injection point projects in a direction of the mouth of the plastics material container in the longitudinal direction (L) of the plastics material container, and the first dome structure of the central area is adjoined in a radial direction on an outside by a second dome structure, wherein the second dome structure is arched in a direction of the mouth of the plastics material container, wherein a radius of curvature of the first dome structure is smaller at least locally than a radius of curvature of the second dome structure, wherein at least a transition portion of the base portion is curved at a radius portion in a direction opposite the curvature of the first and second dome structures, and wherein the base portion comprises a plurality of standing face portions each having a substantially straight line course portion extending radially between the second dome structure and the support splines.

2. The plastics material container according to claim 1, wherein the free form surfaces are curvature-continuous with the outer face of the container.

3. The plastics material container according to claim 1, wherein the free form surface for the reinforcement ribs of the first dome and the reinforcement ribs of the second dome are formed at an edge of the container outer face, and a contour of the base to a spline.

4. The plastics material container according to claim 3, wherein n is less than 7.

5. The plastics material containers according to claim 1, wherein a course of curvature of the spline is described by polynomials of the nth degree, n being greater than or equal to 2.

6. A plastics material container for the reception of beverages, said container having a mouth, a wall portion adjoining the mouth in a longitudinal direction (L) of the plastics material container and a base portion designed in the form of a standing face, wherein the plastics material container is formed in one piece, and wherein the base portion has an injection point—situated on an inside in a radial direction (R) with respect to a longitudinal direction (L)—on an outer wall of the plastics material container, a central area which surrounds the injection point, as well as a transition portion which extends from the central area to the wall portion, wherein the transition portion has in at least one radial direction (R) a curvature with a finite radius of curvature in at least one portion, and wherein the base portion includes a plurality of reinforcement ribs which starting from the central area extend in a direction of the wall portion, wherein the reinforcement ribs comprise a free form surface having support splines, wherein the support splines are at least tangentially continuous with an outer face of the base portion and wherein substantially all points of the free form surface have a finite radius of curvature, wherein the central area has a first dome structure which is arched in a direction of the mouth of the plastics material container, and wherein the injection point projects in the direction of mouth of the plastics material container in the longitudinal direction (L) of the plastics material container and merges directly into the first dome structure, and the first dome structure of the central area is adjoined in a radial direction on an outside by a second dome structure, wherein the second dome structure is arched in the direction of the mouth of the plastics material container, wherein a radius of curvature of the first dome structure is smaller at least locally than a radius of curvature of the second dome structure, and wherein a transition portion of the first dome structure merges into a transition portion of the second dome structure, wherein at least a transition portion of the base portion at a radius portion which is curved in a direction opposite the curvature of the first and second dome structures, and wherein the base portion comprises a plurality of standing face portions each having a substantially straight line course portion extending radially between the second dome structure and the support splines.

7. A plastics material container according to claim 6, wherein a standing face of the plastics material container is made annular at least locally, wherein the standing face has a pre-set standing circle diameter portion.

8. A plastics material container according to claim 7, wherein a ratio between the standing circle diameter portion and an external diameter of the plastics material container is between 0.5 and 0.95.

9. A plastics material container according to claim 6 wherein the base portion standing face has a substantially straight line course length which is between 0.01 mm and 2 mm.

10. A plastics material container according to claim 6, wherein the plurality of reinforcement ribs includes a plurality of similar first reinforcement ribs as well as a plurality of second reinforcement ribs, and the plurality of first reinforcement ribs and the plurality of second reinforcement ribs are geometrically different from one another.

11. A plastics material container according to claim 10, wherein a standing face of the plastics material container is interrupted by the plurality of first reinforcement ribs.

12. A plastics material container according to claim 6, wherein the injection point is an area within the central area.

13. The plastics material container according to claim 6, wherein the base region includes a region free from non-curved regions.

14. The plastics material container according to claim 6, wherein the plurality of reinforcement ribs includes first reinforcement ribs and second reinforcement ribs, respectively, which are arranged alternating with one another in a peripheral direction of the base portion.

15. The plastics material container according to claim 6, wherein the plurality of reinforcement ribs includes first reinforcement ribs which extend radially into the central area, and second reinforcement ribs which are shorter in the radial direction R, and do not extend into the central area.

16. The plastics material container according to claim 15, wherein the base portion includes free form surfaces forming the second reinforcement ribs, and long flutings forming the first reinforcement ribs, are formed at the edge of an outer face of the base portion, and wherein the outer face of the base portion contour is joined to splines formed on the bottom portion.

17. The plastics material container according to claim 16, wherein the free form surfaces are curvature-continuous with the outer face.

18. The plastics material container according to claim 16, wherein a course of curvature of the free form surfaces and of the fluting segments is described by polynomials of the nth degree, n being greater than or equal to 2.

19. The plastics material container according to claim 18, wherein n is less than 7.

20. The plastics material container according to claim 6, wherein the radii of curvature of the first dome structure, the second dome structure, the transition portion and the base portion are all tangentially continuous.

21. The plastics material container according to claim 20, wherein a transition from the base portion radius to a spline of the container is curvature-continuous.

22. The plastics material container according to claim 21, wherein the spline merges in a curvature-continuous manner into the container external diameter.

23. The plastics material container according to claim 22, wherein the spline merges in a tangentially continuous manner into the container external diameter.

* * * * *